(12) United States Patent
Vaez-Iravani et al.

(10) Patent No.: US 11,353,389 B2
(45) Date of Patent: Jun. 7, 2022

(54) METHOD AND APPARATUS FOR DETECTION OF PARTICLE SIZE IN A FLUID

(71) Applicant: Applied Materials, Inc., Santa Clara, CA (US)

(72) Inventors: Mehdi Vaez-Iravani, Los Gatos, CA (US); Avishek Ghosh, Mumbai (IN)

(73) Assignee: Applied Materials, Inc., Santa Clara, CA (US)

( * ) Notice: Subject to any disclaimer, the term of this patent is extended or adjusted under 35 U.S.C. 154(b) by 44 days.

(21) Appl. No.: 17/033,521

(22) Filed: Sep. 25, 2020

(65) Prior Publication Data
US 2022/0099546 A1    Mar. 31, 2022

(51) Int. Cl.
*G01N 15/02* (2006.01)
*G01N 15/10* (2006.01)

(52) U.S. Cl.
CPC ..... *G01N 15/0227* (2013.01); *G01N 15/0211* (2013.01); *G01N 2015/1087* (2013.01)

(58) Field of Classification Search
CPC ........... G01N 15/0227; G01N 15/0211; G01N 2015/1087
USPC ........................................................ 356/336
See application file for complete search history.

(56) References Cited

U.S. PATENT DOCUMENTS 8,154,724 B2    4/2012 Mitchell et al.
10,184,875 B2 *  1/2019 Beil ................... G01N 15/1456
2002/0036776 A1    3/2002 Shimaoka
2008/0111992 A1    5/2008 Moriya
2016/0123897 A1 *  5/2016 Pavani .................. G06V 10/20
                                                348/126
2017/0315039 A1 * 11/2017 Beil ................... G01N 15/0211
(Continued)

FOREIGN PATENT DOCUMENTS

JP    2002243624 A    8/2002
JP       3521381 B2    4/2004
JP    2017167081 A    9/2017

OTHER PUBLICATIONS

Gardini et al., "3D tracking of single nanoparticles and quantum dots in living cells by out-of-focus imaging with diffraction pattern recognition," Scientific Reports (2015), 5:16088; doi: 10.1038/srep16088, 10 pages.

(Continued)

*Primary Examiner* — Roy M Punnoose
(74) *Attorney, Agent, or Firm* — Patterson + Sheridan, LLP

(57) ABSTRACT

Examples disclosed herein relate to system and method for detecting the size of a particle in a fluid. The system includes a conduit for transporting a fluid and a sample area. Some of the fluid passes through the sample area. A first imaging device has an optical lens and a digital detector. A laser source emits a first laser beam. The digital detector generates a metric of an initial intensity of a scattered light that passes through the optical lens. The scattered light is scattered from particles passing through the sample area, and includes light from the first laser beam, which passes through the sample area. A controller outputs a corrected particle intensity based upon a comparison of the initial intensity to data representative of intensity of a focused and defocused particle. The corrected particle intensity generates a corrected metric corresponding to an actual size of the particles.

20 Claims, 6 Drawing Sheets

(56) References Cited

U.S. PATENT DOCUMENTS

2018/0259441 A1* 9/2018 Johnson .............. G01N 15/06
2021/0181084 A1* 6/2021 Vaez-Iravani ...... G01N 15/1434

OTHER PUBLICATIONS

Hussain et al., "An ultra-compact particle size analyzer using a CMOS image sensor and machine learning," Light: Science & Applications (2020), 9:21, doi: 10.1038/s41377-020-0255-6, Official journal of the CIOMP, 11 pages.

International Applicaiton No. PCT/US2021/045581, International Search Report and Written Opinion dated Dec. 3, 2021, consists of 9 pages.

Stokowski, Stan, et al., "Wafer Inspecting Technology Challenges for ULSI Manufacturing", Alp Conference Proceedings 449, 405 (1998); https//doi.org/10.1063/1.56824 (12 pages).

* cited by examiner

METHOD AND APPARATUS FOR DETECTION OF PARTICLE SIZE IN A FLUID

BACKGROUND

Field

Examples disclosed herein generally relate to a method and apparatus for detecting the size of a particle in a fluid.

Description of the Related Art

Detection of particles is important in many areas of technology, including, semiconductor manufacturing. The cause of many routinely observed defects in integrated circuit devices can be traced back to contamination from minute particles at some stage of the production process. Often, small contamination particles can be found floating in the ambient atmosphere or even in ultra-pure water (UPW) used at the manufacturing facility. These particles may find their way into the production line, and contaminate substrates during the manufacturing process. A variety of techniques have been used to detect these small particles, including methods and devices that measure the diffusion, aerodynamics, optical, or electrical mobility of the particles in fluids including both gasses and liquids. While such methods provide useful information about the presence of particles, most conventional methods lack accuracy and precision in determining particle size, making the determination of appropriate corrective actions difficult and challenging.

Commercially available tools, commonly referred to as liquid particle counters (LPC), are often used to qualify the degree of purity and cleanliness of the UPW. There are several methods LPCs' use for detecting and measuring particle size or size distribution that include light blocking (obscuration), light scattering, Coulter principle and direct imaging. In light scattering, particle detection can be performed with a laser light. However, because a cross-sectional area of the laser light has greater intensity at the center than near the peripheral region, it is difficult to distinguish between a small particle that passes through the center of the laser light and a larger particle passing through the peripheral region of the laser light. A limitation of this technique is the fact that the detector used typically has a single sensing element (e.g. a photodiode or photomultiplier tube), and thus the ability to distinguish the arrival of more than one particle in the field of view is lost. For example, a smaller particle having a given size passing through the center of the laser light would have the substantially the same level of light scattering as a larger particle that passes through the peripheral region of laser light.

Accordingly, there is a need for a more accurate method and apparatus for detecting the size of particles in a fluid.

SUMMARY

Disclosed herein are systems and methods for detecting the size of a particle in a fluid. A system for detecting particles is provided. The system includes a conduit configured to store a fluid, and a sample area defined within the conduit. At least a portion of the fluid passes through the sample area at a given velocity. The system further includes a first imaging device that includes an optical lens and a digital detector. A laser source is configured to emit a first laser beam. The digital detector is configured to generate a metric of an initial intensity of a scattered light that passes through the optical lens. The scattered light is scattered from one or more particles passing through the sample area. The scattered light includes light from the first laser beam. The first laser beam is directed to pass through the sample area by the first imaging device. A controller is configured to output a corrected particle intensity based upon a comparison of the initial intensity obtained from the digital detector to data representative of intensity of a focused particle and intensity of a defocused particle. The corrected particle intensity generates a corrected metric corresponding to an actual size of the one or more particles.

In another example, a system for particle detection includes a conduit configured to store a fluid, and a sample area defined within the conduit. At least a portion of the fluid passes through the sample area at a given velocity. The system includes a first imaging device that has an optical lens and a digital detector. A laser source is configured to emit a first laser beam. The digital detector is configured to generate a metric of an initial intensity of a scattered light that passes through the optical lens. The scattered light is scattered from one or more particles passing through the sample area. The scattered light includes light from the first laser beam. The first laser beam is directed to pass through the sample area by the first imaging device. A controller is configured to store a determination module. The determination module is configured to output a corrected particle intensity based upon a comparison of the intensity obtained from the digital detector to data representative of intensity of a focused particle and a defocused particle. The corrected particle intensity generates a corrected metric corresponding to an actual size of the one or more particles.

In yet another example, a method for detecting a particle is provided herein. The method includes generating a metric of an initial intensity of scattered light that passes through an optical lens of a first imaging device. The scattered light is accumulated from one or more particles that passes through a first laser beam. The method includes comparing the initial intensity to data representative of intensity of a focused particle or intensity of a defocused particle. A corrected metric is generated based upon a corrected particle intensity, the corrected particle intensity based on a comparison of between the initial intensity to the data representative of the intensity of a focused particle or the intensity of a defocused particle. The method further includes classifying the corrected particle intensity into a bin corresponding to an actual size of the one or more particles.

BRIEF DESCRIPTION OF THE DRAWINGS

So that the above recited features of the present disclosure can be understood in detail, a more particular description of the disclosure, briefly summarized above, may be had by reference to examples herein, some of which are illustrated in the appended drawings. However, it is to be noted that the appended drawings illustrate only examples and are therefore not to be considered limiting of the disclosure's scope. Accordingly, the appending drawings admit to other equally effective examples.

In order to facilitate understanding, identical reference numerals have been used, where possible, to designate identical elements that are common features. It is contemplated that elements and features of one example may be beneficially incorporated into other examples without further recitation.

DETAILED DESCRIPTION

Figure 1:
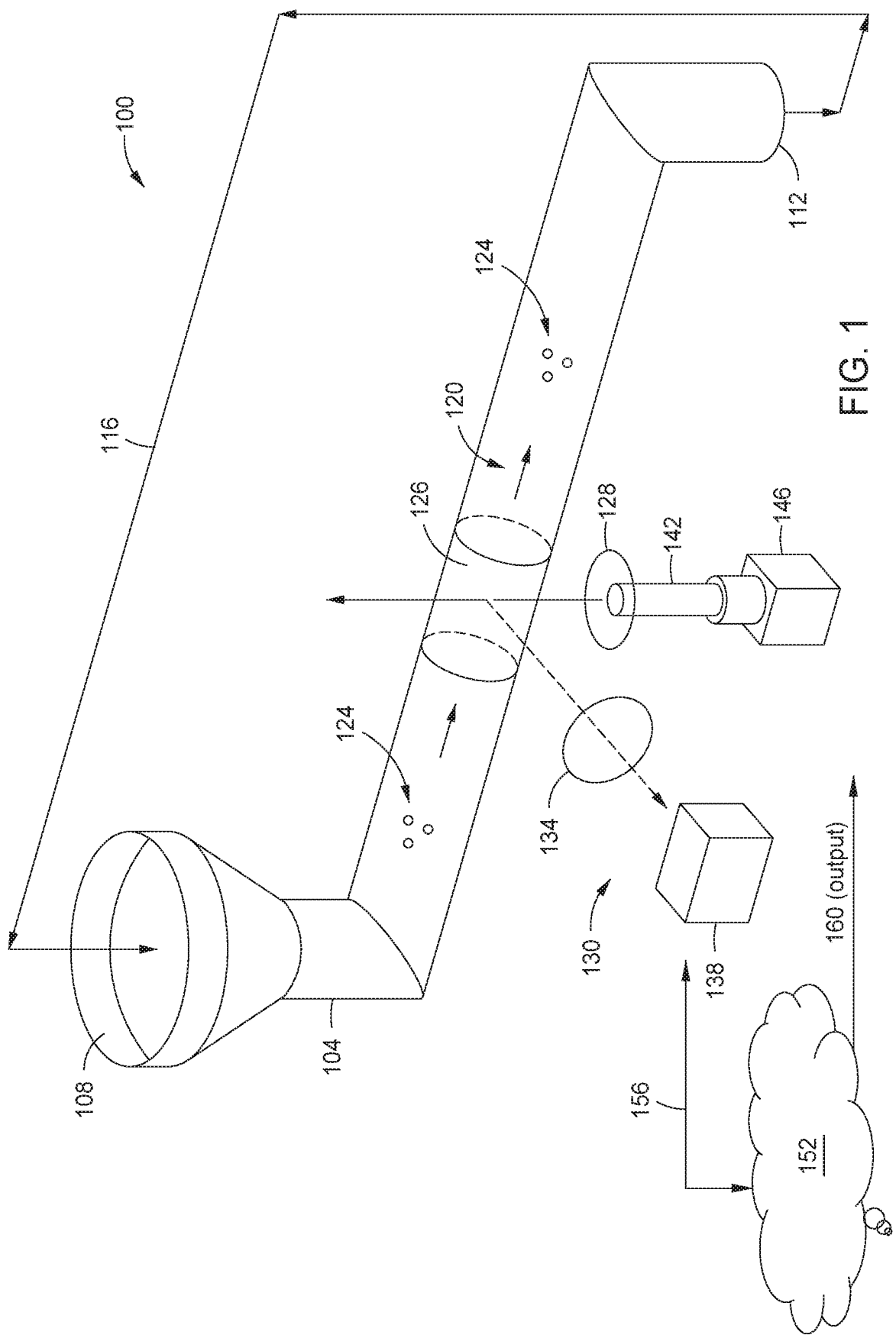
FIG. 1 is a schematic orthogonal view of a particle detection system disposed adjacent to a conduit containing a fluid.

Examples disclosed herein generally relate to systems and methods for detecting and determining the size of particles in a fluid. In one example, the fluid discussed herein is atmospheric air. In another example, the fluid discussed herein is water. It should be noted however that the disclosed subject matter has utility with respect to fluids including many different gases or liquids.

As the need to detect smaller particles in a fluid, increases, the conventional approaches encounter several limitations. For example, one conventional approach uses a laser beam of concentrated light and a relatively high numerical aperture (NA) to collect an image of the light for detecting small particles. However, these conventional tools, such as liquid particle counters (LPC), are limited by the use of a detector having a single sensing element, such as a photodiode or photomultiplier tube. The single sensing element poorly distinguishes the arrivals of more than one particle, i.e., multiple particles, in the sensing element's field of view at different locations. Small or large particles can either pass through a central axis of the laser beam, or through a peripheral region of the laser beam. Due to the concentration of the energy into a small beam of light, many of the particles which fall outside of the central focus area receive little light. The conventional sensing element has difficulty distinguishing an intensity measurement between the particle passing through the central axis or the peripheral region. Small particles scatter light at a lower limit of the sensing element' detection capability, while large particles can produce a scattered signal that exceeds the upper limit of the sensing element. As the particle is imaged, a relatively high numerical aperture of the collection lens implies a short depth of focus. As such, the particles that are not positioned at a focal plane of the collection lens will be imaged as out-of-focus. Additionally, particles that pass outside of the central region receive a reduced radiation intensity, and the particles are imaged as an out-of-focus feature. In order to distinguish the particles that arrive simultaneously in the field of view, one can resort to array sensors, such as CCD or CMOS detectors, which can in principle separate out the images of different particles. However, in such scenarios, if the particles are imaged out of focus due to being away from the focal plane of the imaging lens the, energy scattered by the particles and collected by the lens will be spread onto many pixels at the sensing element. Spreading of the collected light onto several pixels frustrates the ability of the conventional sensing elements to estimate particle size because an intensity measurement of any given pixel signal does not distinguish between small and large particles, out-of-focus particles, or the reduced radiation intensity for particles that do not pass at the focal plane of the sensing element.

The method and imaging system disclosed herein enables simultaneously observation of multiple particles that pass through an illumination beam, such as a laser beam. One advantage of the method and apparatus disclosed is that the effect of any background scattering from the vessel containing the fluid, water, air, or other unwanted signal that affects the detection sensitivity of a sensing system using a digital detector can be reduced. The sensing system having a single laser source can precisely distinguish between small particles passing through a center of the laser beam and large particles passing through the peripheral region of the laser beam.

The intensity of a cross-section of the laser beam disclosed herein has a Gaussian distribution. A total scattered signal (Tss) is proportional to the product of the intensity of light at the particle position (Ps), a scattering coefficient (CS), and a collection efficiency (CE) of the imaging device, i.e., Tss~Ps·CS·CE. The total scattered signal is imaged onto the digital detector(s), in one example. The particle may be assumed to be spherical, i.e., having a circular cross-section. As such, the scattering of light from the particle is governed by Mie scattering. Mie scattering is elastic scattered light of particles that have a diameter similar to or larger than the wavelength of the incident light. For a particle whose diameter is of the order of ¼ the size or smaller than the wavelength (λ) of the incident light, the scattering of light reduces to Rayleigh scattering, according to equation 1 here:

$$I \propto \left(\frac{\left(\frac{n}{n_0}\right)^2 - 1}{\left(\frac{n}{n_0}\right)^2 + 2}\right)^2 \left(\frac{d^6}{\left(\frac{\lambda}{n_0}\right)^4}\right)$$

Where I represents the intensity of the scattered light, n and $n_0$ are the refractive indices of the particle and the surrounding medium respectively, and d is the particle diameter.

The illumination intensity is a function of the power of the laser source, and the cross-section of the laser beam at the point of impinging the particle, according to equation 2 here:

$$I_1 = I_0 e^{-\left(\frac{\sqrt{2}\, r_1}{W_0}\right)^2}$$

Where $I_1$ represents the intensity at the particle at radial position $r_1$ from the central axis of the laser beam, and $W_0$ is the half width of the laser beam at a focal region. The half width of the laser beam is the point at which the intensity is at $1/e^2$ of a peak. The illumination intensity $I_0$ is substantially equal to a power (P) of the laser beam divided by the cross-sectional area (A) of the laser beam.

The collection efficiency is proportional to the square of the numerical aperture of the collecting lens. Thus, the scattered light reaching the focal plane for a given particle as shown here in equation 3:

$$I \propto I_0 \left(\frac{\left(\frac{n}{n_0}\right)^2 - 1}{\left(\frac{n}{n_0}\right)^2 + 2}\right)^2 \left(\frac{d^6}{\left(\frac{\lambda}{n_0}\right)^4}\right) \left\{e^{-\left(\frac{\sqrt{2}\, r_1}{W_0}\right)^2}\right\}$$

$$\left\{ \int_{-(\sin(NA))^{-1}}^{(\sin(NA))^{-1}} \left[ \cos(\theta) \sqrt{(NA)^2 - \sin(\theta)^2} \right] d\theta \right\}$$

Where NA represents the numerical aperture of the collection lens, and the value of the integral is approximately equal to $(NA)^2$.

The particle imaging system and particle detection system is configured so that the focal plane of the collection lens coincides with the central axis of the laser beam. The particle passing through the central axis of the laser beam will maximize an amount scattered light from the particle. Concurrently, the scattered light is efficiently collected by an imaging lens, and is imaged as a small focal spot on the detector array. The image of the focal spot is an Airy disc pattern, i.e., a central bright circular region of the pattern produced by light diffracted when passing through a small circular aperture, if the particle is smaller than the resolution limit of the collection lens.

According to the method and apparatus disclosed herein, the pixels of an Airy disc pattern around the peripheral region of a given particle image are analyzed to determine a particle size. By assessing the distance between the rings of the Airy disc, an estimate of the amount of defocus that the particle experienced at the imaging stage can be ascertained. This estimated distance represents the distance of the position of the particle from the central axis of the laser beam. Knowing the distance, or distances, one can determine the reduction of the intensity of the light at the position where the particle passed through the laser beam. A correction factor in the total signal level due to the scattered light from the particle can thus be determined. The correction factor is utilized in the particle imaging system or particle detection system having a signal laser source used to detect the size of particles in a fluid, such as ultrapure water (UPW), to determine particle sizes and locations. In one example, the particle imaging system may be used to magnify the particle under inspection. In one example, the particle detection system detects the particle in fluid, such as UPW.

FIG. 1 is a schematic orthogonal view of the particle detection system 100 disposed adjacent to a conduit 104 containing a fluid 120. The conduit 104 is suitably configured for flowing the fluid 120. The fluid 120 may be a gas or a liquid which flows through the conduit 104. The fluid 120 may enter the conduit 104 through an inlet 108. An outlet 112 is fluidly coupled to the inlet 108 by the conduit 104. The fluid 120 flows in through the inlet 112, through the conduit 104 and exits through the outlet 112. The inlet 108 can be coupled to a source (not shown) of UPW. In some examples, the outlet 112 communicates with the inlet 108 via a return 116. The return 116 directs the fluid 120 to the inlet 108, restoring fluid 120 back into the conduit 104 that has exited the outlet 112. The fluid 120 may be UPW treated to remove contaminants including organic and inorganic compounds, dissolved and particulate matter, and gases. The gases may be dissolved, volatile, non-volatile, reactive, inert, hydrophilic, and hydrophobic. However, it is understood that the UPW may be treated to remove contaminants not specifically recited herein and the UPW may still contain small particles which the particle detection system 100 may be detected for minimizing particle contamination in semiconductor processing.

A particle 124, i.e., contamination, may be present in the fluid 120. The particle 124 may be residual materials that remained in the fluid 120 after a manufacturing process. For example, the particle 124 may remain in the conduit 104 after the fluid 120 had been used to clean a surface of a substrate. The particle 124 may be mineral deposits, microorganisms, and trace organic and nonorganic chemicals, among other contaminants. Depending upon manufacturing process where the contamination came from, the particle 124 can be from a few micrometers (mm) to a few nanometers (nm).

A sample area 126 may be a portion or segment of the conduit 104. The sample area 126 may be part of the conduit 104 and merely denote a location of the conduit 104. Alternately, the sample area 126 may be vessel, bolt on section of conduit, a section inserted into the conduit 104, or other suitable device making the conduit 104 ready for sampling by the particle detection system 100. The sample area 126 may be made of glass, quartz, plastic, or other substantially transparent material that enables light transmission and detection from the particle detection system 100. In one example, the conduit 104 is formed from quartz and the sample area 126 is located at the intersection of the particle detection system 100. In another example, a transparent section of conduit replaces a section of the conduit 104 in forming the sample area 126. While the sample area 126 is shown as generally cylindrical, the shape is not limited to this geometry, and may be any geometry such that the fluid 120 is configured to flow therethrough. The sample area 126 surrounds the fluid 120 traveling through the conduit 104. The particles 124 in the fluid 120 passes through the sample area 126 and visible to the particle detection system 100.

The particle detection system 100 includes a laser source 146 and a particle detector 130. The particle detector 130 includes an imaging lens 134 and a digital detector 138. The laser source 146 emits an optical beam 142. A focusing lens 128 is positioned between the laser source 146 and the sample area 126. The focusing lens 128 focuses or narrows a diameter of the optical beam 142 before the optical beam 142 enters the sample area 126. Alternatively, the focusing lens 128 can widen the diameter of the optical beam 142. The optical beam 142 may be configured such that light reflected from the particle 124 is dominated by p-polarized illumination of particles. P-polarized illumination of light has an electric field polarized parallel to the plane of incidence. Each pulse of scattered light may include illumination of scattered light generated from the particle(s) 124. By analyzing the intensity of the scattered light, the size of each particle 124 can be determined.

The intensity I of the scattered light can be expressed by equation 1, shown and discussed above. An illumination intensity is represented by $I_0$; n is a refractive index of the particle 124; $n_0$ is a refractive index of the fluid; $\lambda$ is a wavelength of light in a vacuum. Herein the light refers to light from the optical beam 142. The wavelength $\lambda$ may be any range between the DUV (0.2 nm) to the near-infrared range (1050 nm). The variable d represents the diameter of the particle 124. Equation 3, shown and discussed above, describes the scattered intensity I due to the particle 124 having a small diameter d compared with the wavelength A of the optical beam 142, for example, the diameter d of the particle 124 is smaller than ¼ the wavelength $\lambda$ of the optical beam 142.

The particle detector 130 transmits information 156 to a database 152. The particle detector 130 may additionally receive information 156 from the database 152. The information includes 156 includes data that is used to correct or fit the intensity I of the scattered light from the particle 124 collected by the digital detector 138. The digital detector 138 is an image sensor or imager that detects and conveys information used to make an image. The information is typically stored in an array with each pixel value of the image stored in a respective row and column of the array.

Figure 6:
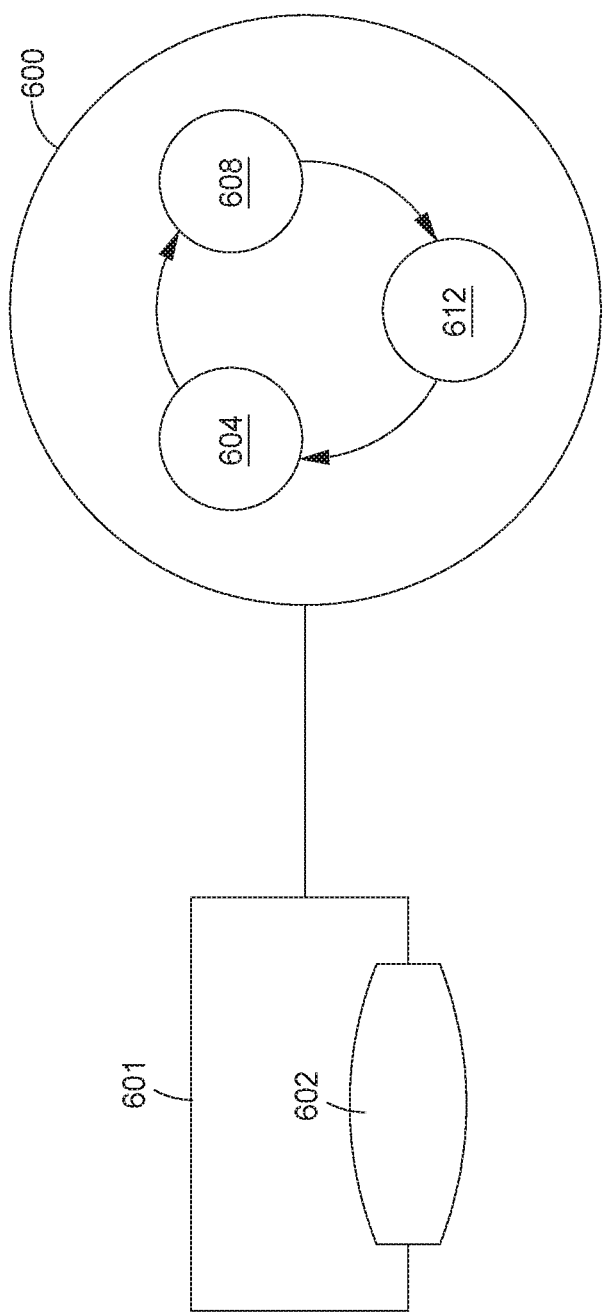
FIG. 6 is a plan view of an imaging device coupled to a controller for use in the particle detection system of FIG. 1 and the particle imaging systems of FIG. 2.

The information 156 may be transmitted or received from an output 160. The output 160, in one example, is a local computer, having a controller 600, as shown in FIG. 6. In another example, the output 160 is a remote computer, or a virtual computer having the controller 600.

Figure 2:
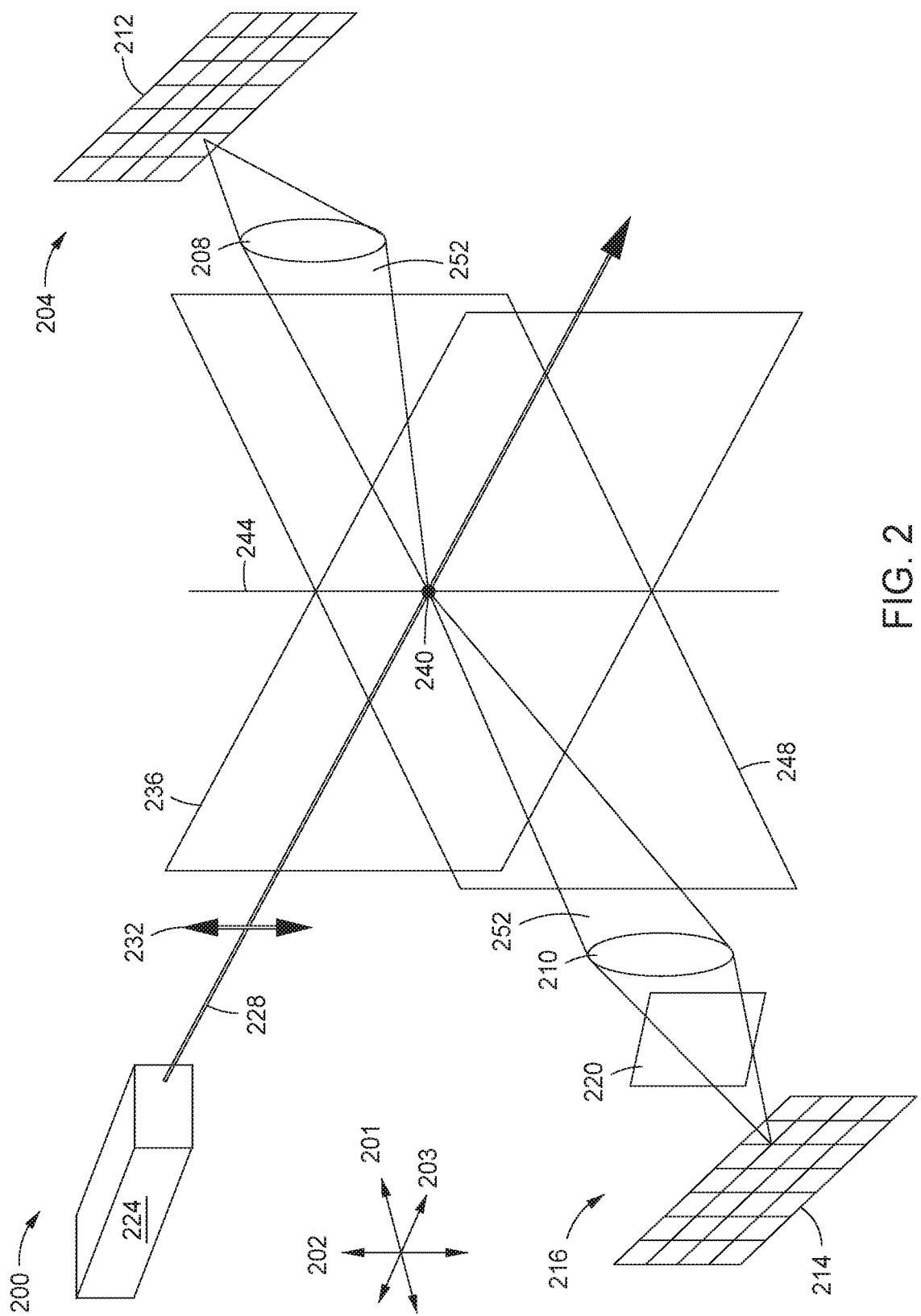
FIG. 2 is a schematic orthogonal view of a particle imaging system having two imaging devices suitable for use with the particle detection system illustrated in FIG. 1.

FIG. 2 is a schematic orthogonal view of a particle imaging system 200 having two imaging devices suitable for use with the particle detection system 100 illustrated in FIG. 1. The particle imaging system 200 is configured to detect a particle 240. The particle 240 is substantially similar to the particle 124 discussed above in respect to all characteristics of the particle 124 including size. In one example, the particle imaging system 200 includes a first imaging device 204 and an optional second imaging device 216. In another example, the particle imaging system 200 includes only one of the first imaging device 204 or the second imaging device 216.

The first imaging device 204 has a first imaging lens 208 and a detecting array 212. The first imaging lens 208 is substantially similar to the focusing lens 128 as described above. Similarly, the detecting array 212 is substantially similar to the digital detector 138 described above. The second imaging device 216 has a second imaging lens 210 and a second detecting array 214. Each detecting array 212 and 214 is configured to detect and store an 'n×m' array of pixels, i.e., having 'n' pixel rows and 'm' pixel columns. Each detecting array 212 and 214 is an image sensor such as a charged coupled device (CCD), an active pixel sensor (CMOS), a hybrid CCD/CMOS, or other suitable imaging sensor. A value for either n or m may be between a small single-digit number and several thousand and indicative of the resolution of the image stored, i.e., higher values indicative of higher resolution with smaller pixels.

An attenuator 220 may be placed between the particle 240 and the detecting array 212. In one example, the attenuator 220 can optionally be positioned between the first imaging lens 208 and the detecting array 212. In another example, the attenuator 220 is placed between the first imaging lens 208 and the particle 124. The attenuator 220 may be colored, stained, and/or tinted transparent material such as glass, plastic, or quartz. The attenuator 220 may reduce the amount of the scattered light from a laser beam 228 impacting the particle 240 by about a factor of 100, compared to a case in which the attenuator 220 is not used. The attenuator 220 increases the range of sizes of the particle(s) 240 which can be detected by the detecting array 212 before saturation of the detecting array 212, i.e. a capability of the detecting array 212 to accumulate scattered light 252 at the first imaging lens 208 is exceeded. For example, when the attenuator 220 is utilized, the detecting array 212 can detect particles 240 within a range of about 50 nm to about 1000 nm. Within this range, the detecting array 212 can detect scattered light due to p-polarized illumination from the particle 240.

A laser source 224 is configured to emit the laser beam 228. The laser beam 228 has substantially the same properties as the optical beam 142, described above. The laser beam 228 has a wavelength A. The laser beam 228 is projected along the path of a focal plane 236. The focal plane 236 includes a polarization direction of illumination 232 that may be along a central axis 244 on which the particle 240 passes through the laser beam 228. In one example, the central axis is along the y-direction 202. In one example, the polarization direction of illumination 232 refers to a polarization of the laser beam 228. The polarization direction of illumination 232 is also the direction of an electric field. The polarization direction of illumination 232 is coplanar with the focal plane 236. For p-polarized illumination, the polarization direction of illumination 232 is perpendicular to a direction of propagation of the laser beam 228. The polarization direction of illumination 232 is parallel to the image plane of the collection lenses, 208 and 210.

A particle plane 248 is perpendicular to a direction of propagation of the laser beam 228 and includes the direction of travel of the particle 240, i.e., the central axis 244, and the optical axis of the imaging lenses 208 and 210. In other words, the particle plane 248 is projected along the x-direction 201 and the y-direction 202. A z-direction 203 is orthogonal to the x-direction and the y-direction 202. The particle plane 248 is perpendicular to the focal plane 236. The particle 240 can propagate along the particle plane 248 in a negative y-direction 202. The passage of the given particle 240 through the laser beam 228 will create a pulse of scattered light 252 due to scattering by p-polarized illumination. The pulse of light is converted to the metric (e.g. voltage or current), and the metric is stored as a signal on the output of the detecting array 212.

Scattered light 252 is collected by the first imaging lens 208 of the first imaging device 204. Scattered light 252 creates a voltage within the first imaging device 204, and a corresponding signal is stored on the detecting array 212. Optionally, the second imaging device 216 captures the scattered light 252 via the first imaging lens 208. The scattered light 252 may pass through the attenuator 220 before the scattered light 252 impinges on the detecting array 212 causing the array to generate a voltage corresponding to a magnitude of the scattered light 252. The metric corresponding to the magnitude of a voltage is stored with a corresponding measured value or metric of an n×m pixel of the detecting array 212. In another example, the current is measured, and a corresponding value or metric is stored on the n×m pixel image. The scattered light 252 corresponding to the illumination intensity $I_0$ generates a corresponding signal in the detecting array 212. An exemplary amount of scattered light 252 collected is a function the numerical aperture (NA) of each of the first imaging lens 208.

Figure 3:
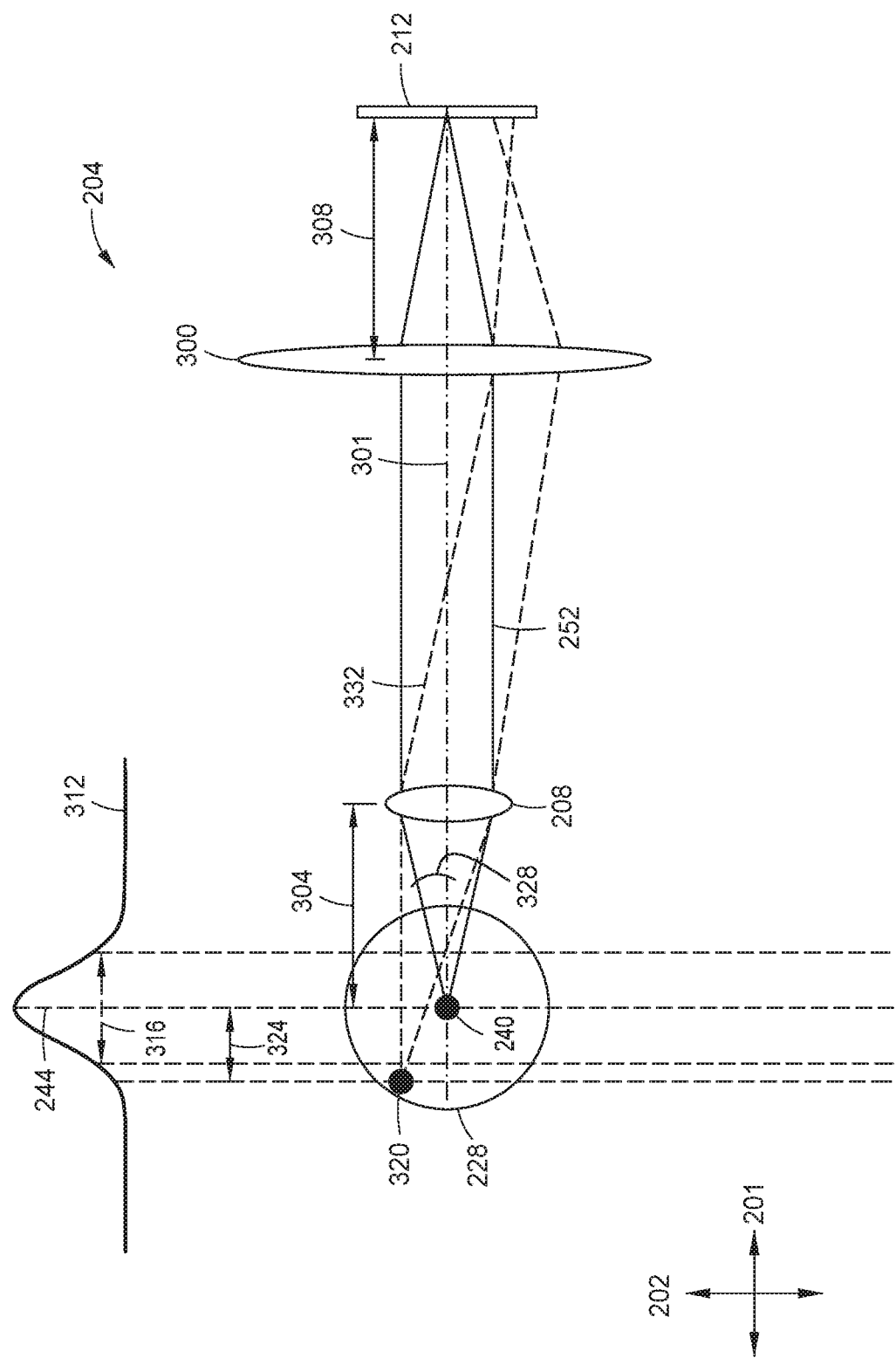
FIG. 3 is a plan view illustrating scattered light collected by one of the imaging devices shown in FIG. 2.

FIG. 3 is a plan view illustrating the scattered light 252 collected by one of the imaging devices 204 or 216, shown in FIG. 2. The first imaging device 204 of shown in FIG. 2 is expanded in FIG. 3 to additionally illustrate an optional third imaging lens 300. The third imaging lens 300 is disposed between the detecting array 212 and the first imaging lens 208. In one example, the third imaging lens 300 is a magnified lens. A first focal length 304 is created between the central axis 244 and the first imaging lens 208. A second focal length 308 is created between the detecting array 212 and the third imaging lens 300. In one example, the first focal length 304 or second focal length may be changed in order to focus or de-focus one of the imaging devices 204 or 216.

The intensity I of a cross section of the laser beam 228 is shown having a Gaussian distribution 312. The cross section of the laser beam 228 is shown projected onto the particle plane 248, when scattered light 252 from the particle 240 is spread onto the detecting array 212. The laser beam 228 has a full beam width 316. The full beam width 228 is twice the beam width $W_0$ in equation 1. A second particle 320 is shown displaced at a distance 324 from the central axis 244 in the x-direction 201. A scattered second light 332 is collected by the first imaging device 204 and stored as a signal on the detecting array 212, in substantially the same manner as that for the particle 240. An angle 328 is an angle at the intersection between an imaginary line 301 orthogonal to the third imaging lens 300 and the edge the scattered light 252 cone. The angle 328 is represented in equation 1 as ⊖. The particle 240 and the displaced particle 320 are two separate particles having the same diameter and radius. The displaced particle 320 differs from the particle 240 in a position within the laser beam 228 cross-section, represented by the Gaussian distribution 312.

The displaced particle 320 may be moved in the x-direction 201 within the cross section of the laser beam 228, which is indicated by the position of displaced particle 320 in the Gaussian distribution 312. As illustrated, the displaced particle 320 can pass at the distance 324 from the central axis 244. The position of particle 240 changes on the detecting array 212 by focusing or defocusing by the angle 328 of one or both of the first imaging lens 208 or the third imaging lens 300. As the angle 328 changes, the position of the displaced particle 320 on the detecting array 212 also moves. In another example, the position of the particle 240 on the detecting array 212 is moved experimentally. Scattered light 252 from the particle 240 or displaced particle 320 is collected at the detecting array 212, the particle 240 on the center of the central axis 244. In another example, a mathematical algorithm is used to focus and de-focus an image of the particle 240 shown in FIGS. 4A-4F.

Figure 4A:
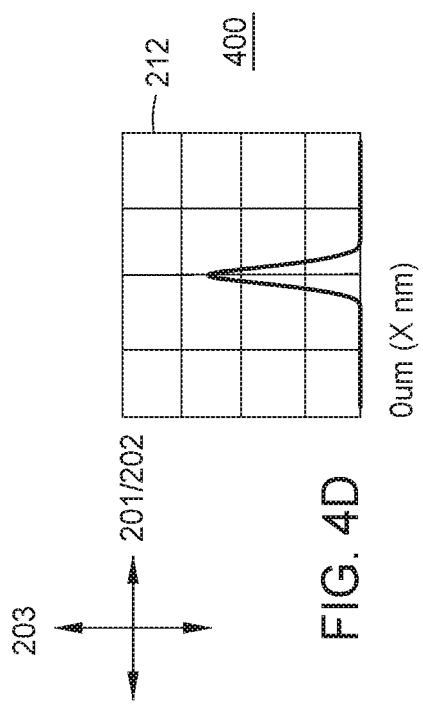
FIGS. 4A-4F depict graphs illustrating the distribution of scattered light collected by a detecting array of the particle imaging system shown in FIGS. 1 and 2.
Figure 4B:
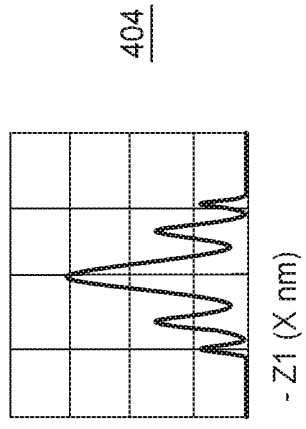
Figure 4C:
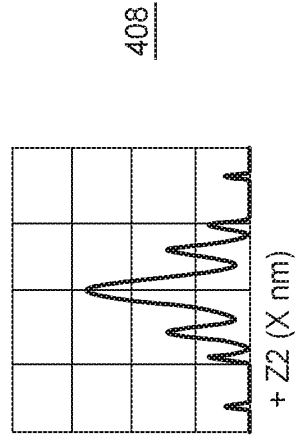

FIGS. 4A-4F depict graphs illustrating the distribution of scattered light 252 collected by a detecting array of the particle imaging system 200 shown in FIG. 2. FIGS. 4A-4C illustrate diffraction patterns of the scattered light 252 projected onto the detecting array 212 as the particle 240 passes through the cross-section of the laser beam 228. The diffraction pattern includes a focal spot 400. In some examples, the diffraction patterns include rings of light 404-408. The scattered light 252 of the particle 240 traveling along the central axis 244 collects as a focal spot 400 on the detecting array 212. The focal spot 400 is an Airy disk, in one example. In another example, rings of light 404 are projected onto the detecting array 212. As the distance 324 of the displaced particle 320 from the central axis 244 increases, the rings of light 404 are formed around the focal spot 400. The focal spot 400 and the rings of light 404 are projected onto the detecting array 212. In yet another example, as the second particle 320 increases the distance 324 from the central axis 244, outer rings of light 408 are projected onto the detecting array 212. As such, the focal spot 400, the rings of light 404 and the outer rings of light 408 are projected onto the detecting array 212. FIGS. 4B-4C illustrate the scattered second light 332 spread over pixels of the detecting array 212 due to defocusing of the displaced particle 320 at the first imaging lens 208.

Figure 4D:
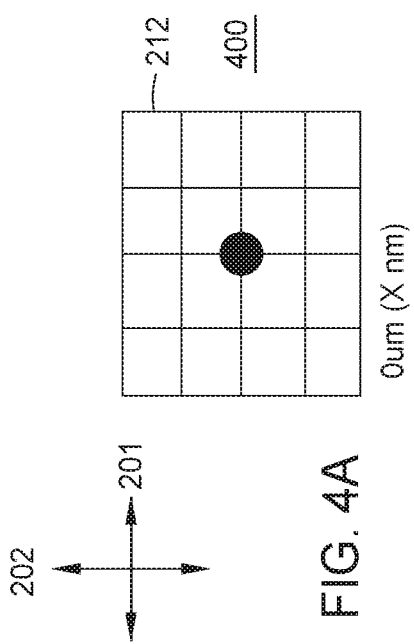
Figure 4E:
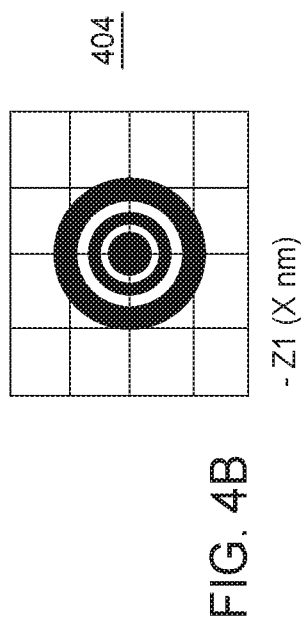
Figure 4F:
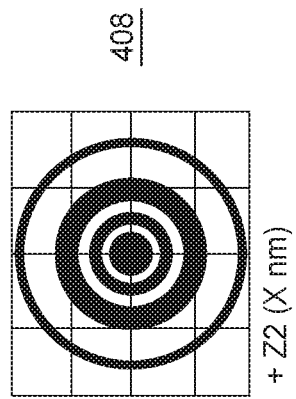

FIGS. 4D-4F illustrate the profile of the intensity of the scattered light 252 received by detecting array 212 as the particle 240 passes through the cross-section of the laser beam 228. The intensity of the rings of light 404-408 are imaged on the detecting array 212 as an out-of-focus feature. Energy scattered by the displaced particle 320 and collected by the first imaging lens 208 is spread onto pixels of the detecting array 212. An intensity of each of the rings of light 404-408 is less than an intensity of the focal spot 400. Each ring of light 404-408 is shown as a local maxima of intensity at a specific location along the z-direction 203. In one example, the intensity of the rings of light 404 is greater than the intensity of the outer rings of light 408. A local minima of intensity may not appear on the detecting array 212. Advantageously, the apparatus and method disclosed herein utilizes intensity data from the rings of light 404-408 in determining the actual size of the particle 240.

A positional component Z corresponds to a distance the particle 240 is from the central axis 244. The positional component Z can be positive or negative. A size component X corresponds to a diameter of the particle 240. The size component X of the particle 240 is from about 10 nm to about 1000 nm, such as about 50 nm. In one example, the particle 240 size component X is about 40 nm; and in another example, the size component X is about 50 nm. An exemplary size of a detectable particle 240 is about 20 nm. In other examples, the detectible particle 240 is about 60 nm, or about 35 nm. In another example, the detectible particle 240 has a size from about 50 nm to about 100 nm, such as about 80 nm. In yet another example, the detectible particle 240 has a size of about 20 nm to about 30 nm, such as about 25 nm, or about 10 nm.

Figure 5:
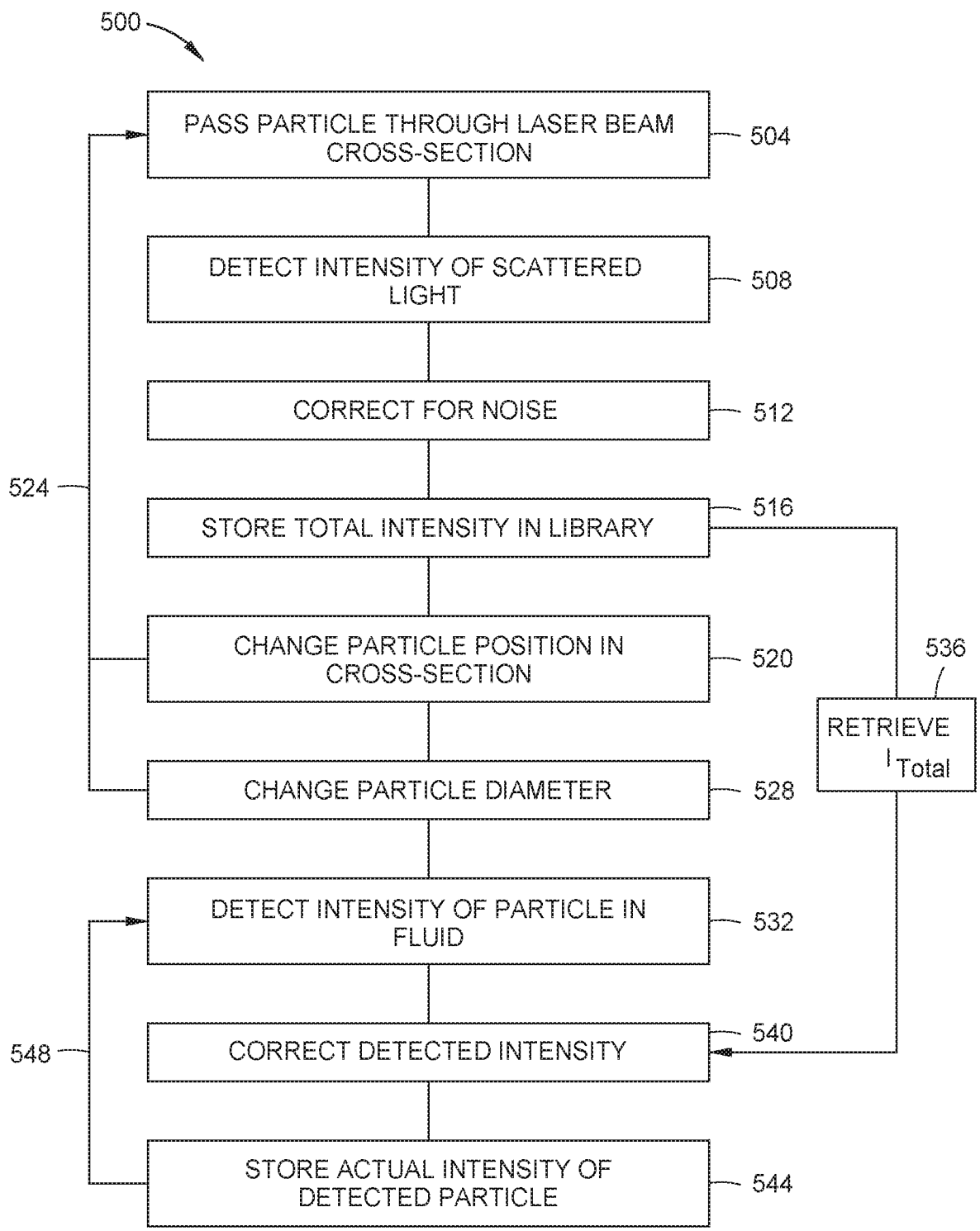
FIG. 5 is a flow diagram of a method for determining the size of a particle.

FIG. 5 is a flow diagram of a method 500 of determining the size of a particle. At block 504, a particle passes through a cross-section of a laser beam. In one example, the particle 240 passes through the cross-section of the laser beam 228 emitted by the laser source 224. As the particle passes through the laser beam, scattered light 252 is accumulated and collected at an imaging device. The particle has a diameter $d_m$ and a given radius $r_n$. Multiple particles of a known diameter are passed through the laser beam. Scattered light from the particles is collected at the imaging device.

At block 508, an intensity of the scattered light is detected at a digital detector. The detecting array 212 described above is an example of the digital detector. As noted above, the intensity of the scattered light correlates to the size of the particle. Additionally, the intensity of the scattered light correlates to a horizontal position of the particle within the cross-section of the laser beam. For example, as the particle 240 passes through the laser beam 228, scattered light 252 is collected by the first imaging device 204. The scattered light, in one example, has a diffraction pattern that includes a focal point, such as the focal spot 400. The intensity $I_{radial}$ at a given radius ($r_n$) and given diameter, ($d_m$) is stored with a radial and diameter component $I_{radial}$ ($r_n$, $d_m$).

In another example, the particle passes through the laser beam at a distance from the center of the laser beam. The diffraction pattern of the scattered light includes rings of light that circumscribe the focal point. The rings of light vary in intensity and can include local minimums of intensity and local maximums of intensity. The intensity of the ring of light decreases as the radial distance of the ring of light from the focal point increases. Scattered second light 332 is an example of the light collected from the displaced particle 320 that passes at a distance 324 from the central axis 244. The rings of light 404-408 are examples of the rings of light in the diffraction pattern within the collected scattered light.

Background noise is determined and corrected for at block 512. A determination module is configured to remove background noise from the focused intensity or defocused intensity. The determination module receives data from block 508. The data from block 508 is processed at the determination module, which identifies the background signal in the received data. The background signal can be subtracted from the detected intensity signal(s). In one example, a difference is determined by subtracting the background signal from the intensity for each detected particle. The determination module separates the background signal from intensity data and provides the corrected data to block 516.

A total radial intensity $I_{total}$ is stored at block 516. The total radial intensity $I_{total}$ is the total scattered light due to a given particle, at a given radius, for a pre-determined diameter. The total radial intensity can be represented with a radial and diameter component as I ($r_n$, $d_m$), where n and m are in the domain of all real numbers. The total radial intensity ($I_{total}$) is equal to the sum of the intensity at a given radius ($I_{radial}$) and a correction factor ($I_{correction}$), where the intensity is greater than background noise, i.e., $I_{radial}$>background signal. The background signal includes the noise of the imaging device and/or the background signal of the fluid in which the particle is flowing). Each of the intensities $I_{total}$ ($r_n$, $d_m$) for a given radius and diameter, is stored in a library, such as a database.

At block 520, the particle(s) passing through the laser beam have a given diameter, $d_m$. The particle is passed through the laser beam at a position $r_n$ displaced from a cross-sectional center of the laser beam. In an example, the displaced particle 320 passes through the laser beam 228 at the distance 324 from the central axis 244. Intensity data is collected at the imaging device for multiple positions $r_n$ within the laser beam cross-section, where r represents the distance from the center and n represents a positive or negative position along the x-direction. When intensity data has been collected for the particle of a given size, at block 524, the method 500 may return to block 504 in order to change the position $r_{n+1}$, of the detected particle.

At block 528, a diameter $d_m$ of the particles passing through the laser beam is changed. Again, multiple particles of a known diameter are passed through the laser beam. For example, the particle can have a diameter of between about 20 nm and about 30 nm, or about 40 nm and about 50 nm. In yet another example, the diameter may be between about 80 nm and about 100 nm. Scattered light from each of the particles is detected, as described at blocks 504-516. The method 500 may return, at block 524, to block 504, changing the diameter $d_{m+1}$, of the particle to be detected.

At block 532, an intensity of a particle or group of particles is detected in a fluid. In one example, the fluid is air. In another example, the fluid can be a gas. Ultrapure water (UPW) is another example of the fluid in which the particle can be detected. The particle detector 130, in one example, detects an initial intensity $I_{initial}$ of the particle(s) 124 in the conduit 104 of ultrapure water. The digital detector 138 is one example of the digital detector, described herein. The intensity of scattered light from the particles 124 creates a diffraction pattern on the particle detector 130. The diffraction pattern includes a focal point and rings or light, similar to the focal points and rings of light discussed above with reference to FIGS. 4A-4E.

The initial intensity $I_{initial}$ is corrected at block 540, with the total intensity $I_{total}$ ($r_n$, $d_m$) that is retrieved at block 536. The initial intensity $I_{initial}$ may utilize the total intensity $I_{total}$ to fit the initial intensity $I_{initial}$. In another example, total intensity $I_{total}$ ($r_n$, $d_m$) is a data set by which the initial intensity $I_{initial}$ is compared. An actual intensity $I_{actual}$ may be determined by fitting the initial intensity $I_{initial}$ according to a nearest neighbor algorithm. In another example, the actual intensity $I_{actual}$ is determined by a look-up algorithm, utilizing the magnitude of the intensity to determine a closest match. In another example, the actual intensity $I_{actual}$ of the particle is classified based upon the magnitude of the intensity. Classifying the particle(s) by size includes sorting information representative of each particle into bins or categories. The information corresponds to the metric of the intensity signal, the metric including voltage or current measurements.

At block 544, actual intensity $I_{actual}$ is stored in a local or remote memory. At block 548, the method 500 returns to block 532, where additional particles 124 are detected.

FIG. 6 is a plan view of an imaging device 601 coupled to a controller 600 for use in the particle detection system 100 of FIG. 1 and the particle imaging systems 200 of FIG. 2. The first imaging device 204 in some examples is the imaging device 601. And in another example, the second imaging device 216 is the imaging device 601. In another example, the imaging device 601 is the particle detector 130. It should be appreciated that one or both of the first imaging device 204 and the second imaging devices 216 can be configured as the imaging device 601. Similarly, the particle detector 130 can be configured as the imaging device 601. As such, the first imaging device 204 and the second imaging devices 216 and the particle detector 130 are configured to be used individually or in combination with each other. The controller 600 includes a processor 604, a memory 608, and support circuits 612 that are coupled to one another. The controller 600 may be on-board the imaging device 601, or in an alternative example, the controller 600 may be on-board a remote device (not shown) that receives images from the imaging device 601. The imaging device 601 has at least one focusing lens 128 that is configured to capture images of the particle detection system 100.

The first imaging device 204 includes an input control unit, such as power supplies, clocks, cache, input/output (I/O) circuits, coupled to the various components of the first imaging device 204 to facilitate control thereof. Optionally, first imaging device 204 can include a display unit (not shown). The processor 604 may be one of any form of general purpose microprocessor, or a general purpose central processing unit (CPU), each of which can be used in an industrial setting, such as a programmable logic controller (PLC), supervisory control and data acquisition (SCADA) systems, or other suitable industrial controller. It is understood that the controller 600 may also be coupled to the second imaging device 216 in substantially the same manner as the first imaging device 204.

The memory 608 is non-transitory and may be one or more of readily available memory such as random access memory (RAM), read only memory (ROM), or any other form of digital storage, local or remote. The memory 608 contains instructions, that when executed by the processor 604, facilitates the operation of the first imaging device 204. The instructions in the memory 608 are in the form of a program product such as a program that implements the method of the present disclosure. The program code of the program product may conform to any one of a number of different programming languages. Illustrative computer-readable storage media include, but are not limited to: (i) non-writable storage media (e.g., read-only memory devices within a computer such as CD-ROM disks readable by a CD-ROM drive, flash memory, ROM chips, or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the methods described herein, are examples of the present disclosure.

In one example, a set of particles 240, such as a training set, is released into the particle imaging system 200 to determine the diffraction pattern (i.e., the focal spot 400, or rings of light 404-408) of the set of particles 240. The set of particles 240 can be about 20 nm to about 60 nm, such as about 40 nm, in one example. The set of particles 240 are substantially identical, so that if each particle 240 passes through the central axis 244, the total integrated signal for each particle 240 remains the same for each particle 240 in the set of particles 240. A variation in the total integrated signal for each particle 240 is an indication of the separation (i.e., distance 324) between each particle 240 of the set of particles 240 and the central axis 244. The position of each particle 240 with respect to the central axis 244 is determined. In addition, the diffraction patterns of all the particles 240 are received by the n×m array, such as the detecting array 212, and the diffraction patterns are stored in memory 608. As such, a relationship between the diffraction patterns of an out-of-focus particle (e.g. displaced particle 320), corresponds to the amount of defocus of an imaging lens, such as the first imaging lens 208. Otherwise stated, a determination is made of the separation between the out-of-focus particle path, such as the path of the displace particle 324, and central axis 244. Data from this training set of particles 240 is stored in memory 608 and used as a basis for a machine learning algorithm. The diffraction pattern generated by a particle 240 having a "small" size is substantially the same, regardless of the diameter of the particle 240. Otherwise stated, the "small" size of the particle 240 is relative to the diffraction-limited focal distribution of the imaging lens, such as the first imaging lens 208, second imaging lens 210, or the imaging lens 134. In this manner, utilizing the machine learning algorithm enables the particle imaging system 200 to automatically determine position of each particle 240 that passes through central axis 244. In another example, the particle detection system 100 automatically determines the position of the particles 124 that passes through the optical beam 142, utilizing the machine learning algorithm. Exemplary machine learning algorithms include regression algorithms, instance-based algorithms, Bayesian algorithms, decision trees, and neural networks, supervised- and semi-supervised algorithms.

In one example, the disclosure may be implemented as the program product stored on a computer-readable storage media (e.g. 608) for use with a computer system (not shown). The program(s) of the program product define functions of the disclosure, described herein. The programs/instructions include algorithms that are configured to process light collected from particle imaging systems shown in FIGS. 1-5.

Examples disclosed herein generally relate to a method and apparatus for detecting the size of a particle moving through the fluid. Advantageously, the method and apparatus can enhance the distinction between small and large particles in particle detection system that utilizes a single illumination beam. While the foregoing is directed to specific examples, other examples may be devised without departing from the basic scope thereof, and the scope thereof is determined by the claims that follow.

What we claim is:

1. A system for detecting particles, comprising:
a conduit configured to transport a fluid;
a sample area defined within the conduit, wherein at least a portion of the fluid passes through the sample area at a given velocity;
a first imaging device comprising:
an optical lens; and
a digital detector;
a laser source configured to emit a first laser beam, the digital detector configured to generate a metric of an initial intensity of a scattered light that passes through the optical lens, the scattered light is scattered from one or more particles passing through the sample area, the scattered light comprising light from the first laser beam, wherein the first laser beam is directed to pass through the sample area by the first imaging device; and
a controller configured to output a corrected particle intensity based upon a comparison of the initial intensity obtained from the digital detector to data representative of intensity of a focused particle and intensity of a defocused particle, wherein the corrected particle intensity generates a corrected metric corresponding to an actual size of the one or more particles.

2. The system for detecting particles as recited in claim 1, wherein the metric is a voltage or a current corresponding to the initial intensity of the scattered light.

3. The system for detecting particles as recited in claim 1, further comprising:
a determination module, the determination module configured to remove a background signal from the focused intensity or defocused intensity.

4. The system for detecting particles as recited in claim 1, further comprising:
a library in communication with the controller storing the data representative of intensity of a focused particle and intensity of a defocused particle, wherein the library includes data representative of a difference in a focal distance between a pre-determined particle in an array of pre-determined particles and at least one imaging lens of a second imaging device.

5. The system for detecting particles as recited in claim 4, wherein the data representative of intensity of a focused particle and intensity of a defocused particle comprises:
data representative of iteratively accumulating a corresponding intensity for each pre-determined particle in the array of pre-determined particles; and
data representative of a corresponding intensity for each pre-determined particle in the array of pre-determined particles.

6. The system for detecting particles as recited in claim 4, wherein the focal distance is determined by a focal algorithm.

7. The system for detecting particles as recited in claim 4, wherein the focal distance is changed by modulating a physical distance between the pre-determined particle and at least one imaging lens.

8. The system for detecting particles as recited in claim 1, further comprising:
a determination module configured to output the data representative of intensity of a focused particle and intensity of a defocused particle, wherein the determination module is configured to:
change in a pre-determined diameter of a pre-determined particle in an array of pre-determined particles;
iteratively accumulating a corresponding intensity for each pre-determined particle in the array of pre-determined particles; and
store in a library the corresponding intensity for each pre-determined particle in the array of pre-determined particles, wherein the corresponding intensity is one of the intensity of a focused particle and the intensity of a defocused particle.

9. The system for detecting particles as recited in claim 1, wherein the data representative of intensity of a focused particle and intensity of a defocused particle further includes:
   data representative of diffraction patterns; and
   data representative of a total number of rings in each of the diffraction patterns, wherein the diffraction patterns are detected by an array of pixels.

10. The system for detecting particles as recited in claim 9, wherein the data representative of intensity of a focused particle and intensity of a defocused particle further includes:
   data representative of a thickness of each ring in each of the diffraction patterns; and
   data representative of a distance between each ring in each of the diffraction patterns.

11. A system for particle detection, comprising
   a conduit configured to store a fluid;
   a sample area defined within the conduit, wherein at least a portion of the fluid passes through the sample area at a given velocity;
   a first imaging device comprising:
      an optical lens; and
      a digital detector;
   a laser source configured to emit a first laser beam, the digital detector configured to generate a metric of an initial intensity of a scattered light that passes through the optical lens, the scattered light is scattered from one or more particles passing through the sample area, the scattered light comprising light from the first laser beam, wherein the first laser beam is directed to pass through the sample area by the first imaging device; and
   a controller configured to store a determination module, the determination module configured to output a corrected particle intensity based upon a comparison of the initial intensity obtained from the digital detector to data representative of intensity of a focused particle and a defocused particle, wherein the corrected particle intensity generates a corrected metric corresponding to an actual size of the one or more particles.

12. The system for particle detection as recited in claim 11, wherein the corrected metric is a voltage or a current corresponding to the initial intensity of the scattered light.

13. The system for particle detection as recited in claim 11, further comprising:
   a determination module, the determination module configured to remove a background signal from the focused intensity or defocused intensity.

14. The system for particle detection as recited in claim 11, further comprising:
   a library in communication with the controller storing the data representative of intensity of a focused particle and intensity of a defocused intensity particle, wherein the library includes data representative of a difference in a focal distance between a pre-determined particle in an array of pre-determined particles and at least one imaging lens of a second imaging device.

15. The system for particle detection as recited in claim 14, wherein the data representative of intensity of a focused particle and intensity of a defocused particle comprises:
   data representative of iteratively accumulating a corresponding intensity for each pre-determined particle in the array of pre-determined particles; and
   data representative of a corresponding intensity for each pre-determined particle in the array of pre-determined particles.

16. The system for particle detection as recited in claim 11, wherein the data representative of intensity of a focused particle and intensity of a defocused particle further comprises:
   data representative of a focal diffraction patterns; and
   data representative of a total number of rings in each of the focal diffraction patterns.

17. The system for particle detection as recited in claim 16, the data representative of intensity of a focused particle and intensity of a defocused particle further comprises:
   data representative of a thickness of each ring in each of the focal diffraction patterns; and
   data representative of a distance between each ring in each of the focal diffraction patterns.

18. A method for detecting a particle, the method comprising:
   generating a metric of an initial intensity of scattered light that passes through an optical lens of a first imaging device, the scattered light accumulated from one or more particles that passes through a first laser beam;
   comparing the initial intensity to data representative of intensity of a focused particle or intensity of a defocused particle;
   generating a corrected metric based upon a corrected particle intensity, the corrected particle intensity based on a comparison of between the initial intensity to the data representative of the intensity of a focused particle or the intensity of a defocused particle; and
   classifying the corrected particle intensity into a bin corresponding to an actual size of the one or more particles.

19. The method of claim 18, further comprising:
   retrieving the corrected particle intensity from a library, wherein the data representative of the intensity of a focused particle and the intensity of defocused particle is stored in the library, wherein the library is generated experimentally by passing an array of particles through a second laser beam.

20. The method of claim 18, further comprising:
   removing a background signal from the data representative of intensity of a focused particle or intensity of a defocused particle.

* * * * *